United States Patent
Cassoni

(10) Patent No.: US 6,739,604 B2
(45) Date of Patent: May 25, 2004

(54) MOTORIZED GOLF CART WITH DETACHABLE GOLF CLUB CARRIERS

(76) Inventor: Robert P. Cassoni, 2366 Wymore Pl., Centerville, OH (US) 45459

( * ) Notice: Subject to any disclaimer, the term of this patent is extended or adjusted under 35 U.S.C. 154(b) by 0 days.

(21) Appl. No.: 09/961,882

(22) Filed: Sep. 24, 2001

(65) Prior Publication Data

US 2003/0057001 A1 Mar. 27, 2003

(51) Int. Cl.⁷ .................................................. B62B 7/02
(52) U.S. Cl. .................. 280/47.131; 414/462; 224/274
(58) Field of Search ................... 224/274–282; 414/462; 280/DIG. 5, DIG. 6, 47.131, 47.17, 47.24; 180/19.1

(56) References Cited

U.S. PATENT DOCUMENTS

| | | | | |
|---|---|---|---|---|
| 2,825,574 A | * | 3/1958 | Williamson | 280/38 |
| 3,043,389 A | * | 7/1962 | Steinberg | 180/208 |
| 3,583,510 A | * | 6/1971 | Hastings | 180/11 |
| 3,608,659 A | * | 9/1971 | Gardner | 180/19.3 |
| 3,777,836 A | * | 12/1973 | Riza | 180/213 |
| 4,042,055 A | | 8/1977 | Ward | 180/60 |
| 4,533,013 A | * | 8/1985 | Hightower | 180/216 |
| 4,573,549 A | * | 3/1986 | Pankow | 224/533 |
| 5,123,531 A | * | 6/1992 | Beretta | 414/462 |
| 5,482,304 A | | 1/1996 | Smith | 280/204 |
| D369,762 S | * | 5/1996 | Molzon et al. | 414/462 |
| 5,727,642 A | * | 3/1998 | Abbott | 280/79.5 |
| 5,738,261 A | * | 4/1998 | Dula | 224/527 |
| 5,890,545 A | | 4/1999 | Smith et al. | 172/200 |
| D409,557 S | * | 5/1999 | Armour | D12/408 |
| 6,126,050 A | * | 10/2000 | Aliano, Jr. | 422/104 |
| 6,164,896 A | * | 12/2000 | Cummins | 414/462 |
| 6,193,256 B1 | | 2/2001 | Banary, Jr. | 280/400 |
| 6,361,264 B1 | * | 3/2002 | Guthrie et al. | 414/462 |
| 6,409,188 B1 | * | 6/2002 | Hesmer | 280/79.5 |
| 6,471,281 B1 | * | 10/2002 | Tyrer et al. | 296/100.11 |
| 2001/0048011 A1 | * | 12/2001 | Burns | 224/527 |

FOREIGN PATENT DOCUMENTS

JP  10155954  6/1998

* cited by examiner

*Primary Examiner*—Lesley D. Morris
*Assistant Examiner*—Daniel Yeagley
(74) *Attorney, Agent, or Firm*—Davidson, Davidson & Koppel LLC

(57) ABSTRACT

A motorized golf cart for movement over a ground surface comprising a motor, a vertical golf bag bay, and two golf club carrier hitches. A vertical golf bag bay is provided, i.e., a bottomless bag bay without a horizontal support plane.

13 Claims, 5 Drawing Sheets

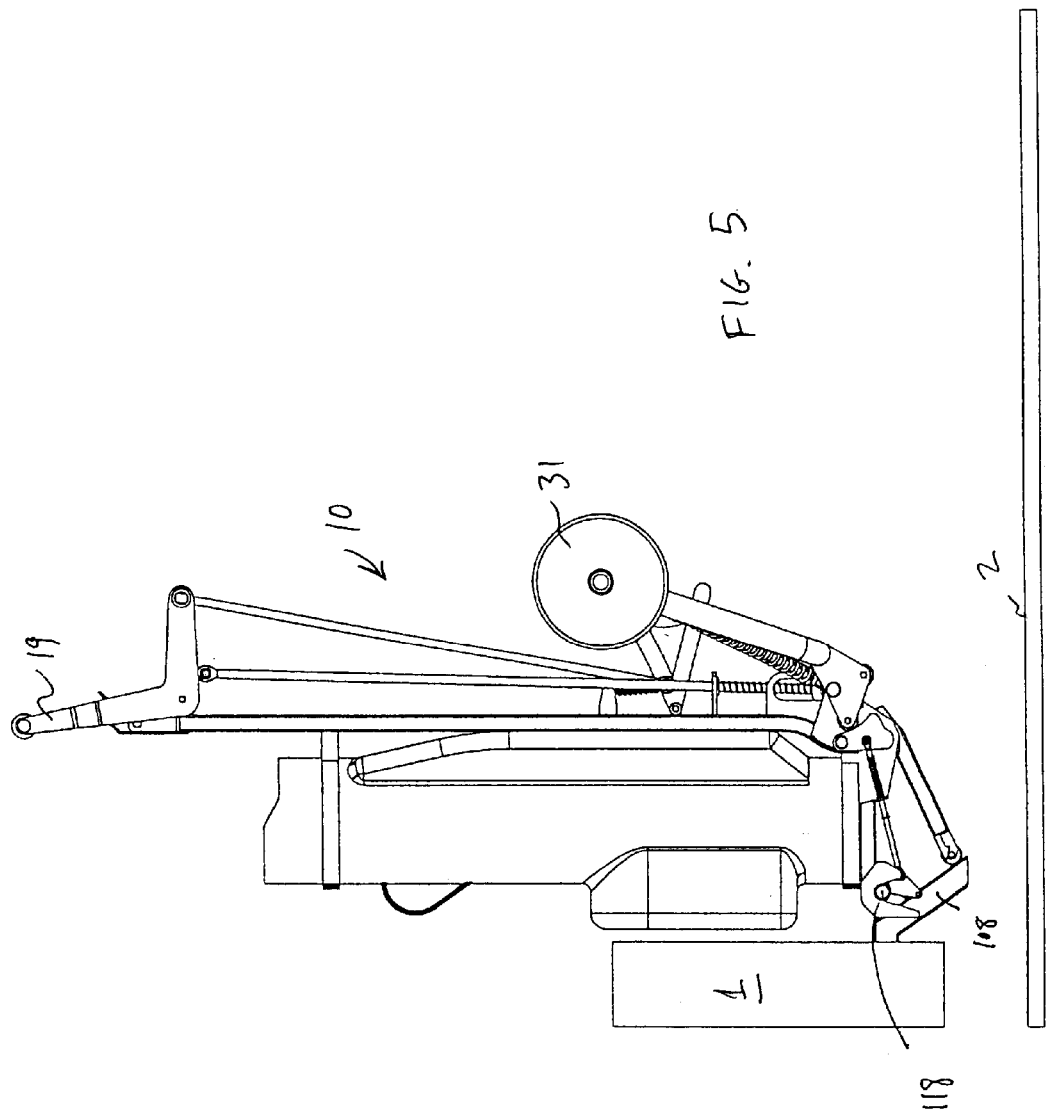

MOTORIZED GOLF CART WITH DETACHABLE GOLF CLUB CARRIERS

BACKGROUND OF THE INVENTION

The present invention relates generally to the sport of golf, and more particularly to golf cars or carts and golf club carriers.

On a golf course, golfers often carry their own golf clubs in a golf club bag. The golfers may walk the entire course with the golf club bag held by a strap swung over their shoulder. A typical set of golf clubs may include 12 golf clubs or more. The set of clubs thus is often heavy and cumbersome to carry over an entire course. A caddie may accompany the golfer to aid in carrying the golf clubs.

Wheeled golf club carriers, also known as pull or push carts, have been developed to permit golfers to wheel their clubs over the course, by pulling the carrier by hand. The golf club carriers typically permit a golf bag to be attached by straps, and the golf bag is thus transported over the entire golf course by the golfer pulling or pushing the carrier. Such manual golf club carriers and the associated walking of the entire course however lead to slow golf games, which can be a major problem on popular golf courses. Moreover, some golfers fatigue or are incapable of walking an entire golf course, which can require 4 kilometers of travel or more.

Motorized golf cars capable of carrying two golfers and having a golf bag bay for carrying the golfers golf bags and typically having electric or internal-combustion motors, also are known. These golf cars are known colloquially as golf carts, and the two terms are used interchangeably herein. Some courses even require such carts to speed golf play. These motorized golf carts typically move along specially-designated areas, or cart paths, on the golf course so that golfers can proceed with ease quickly throughout the golf course. Some golf courses permit golf carts to travel not just on the cart paths, but also over the entire course, including fairways. However, this travel can damage the golf course. For example, when a fairway is wet, the golf carts can leave muddy track marks on the fairway or even on the greens. For this reason, many golf courses confine motorized golf carts to the cart paths.

When using a motorized golf cart, golfers typically place their golf bags in the golf cart, so that the bags rest on a horizontal surface of a bag bay. The golf bags then are strapped in. The golfers do not remove the bags during play, since the bags with the clubs are heavy and the golf bag must be lifted to be strapped in. Typically, the bottom of the bag sits at least 0.3 meters from the ground, and the straps are even higher. The lifting of the golf bag in the first place is also burdensome.

On a course where the motorized golf carts are confined to the cart paths, golfers without caddies typically golf as follows: (1) The golfer drives his cart to a tee, decides what club to use and removes that club from the golf bag located in the golf cart, and then tees off; and (2) the golfer then drives the cart along the path to a location near the golf ball, guesses which one or two clubs might be proper, removes the clubs from the golf bag situated or attached to the golf cart; and then walks to the golf ball with the clubs in hand, and hits the ball. This second step continues until the golfer has placed the ball in the cup.

A problem occurs when a golfer selects the wrong club or clubs from the bag in the motorized cart. Improper selection can occur for example because of the lie or by mistaking the distance of the ball or the wind speed at the location of the ball. The golfer then must walk back to the cart and replace his clubs with a proper club. Since his ball may be a long distance from the golf cart, a long delay can result. Moreover, his partner in the motorized golf cart, which typically has two seats, could have driven the motorized cart to a new location, leading to even longer delays.

If two players are using a motorized cart on a golf course where motorized carts are permitted on the fairway, a similar problem may occur: the first golfer may choose one or two clubs, and the second golfer will drive the cart to a new position. If the first golfer has chosen the wrong clubs and must return to the golf cart at a new location to exchange clubs, the speed of play can be drastically reduced.

U.S. Pat. No. 5,727,642 discloses a non-traditional golf bag bay, namely a golf bag carrier assembly that can rotate. While the assembly is detachable, the assembly is not detached during play but rather is rotated out the way so that a disabled golfer can have a full swing motion while seated.

U.S. Pat. No. 4,533,013 discloses a non-traditional golf bag bay with plate like members detachable via lock pins to brackets.

Towing packages for golf carts are known, but are used for connecting golf carts to each other so that the carts can be pulled in a line, for example for easy movement.

SUMMARY OF THE INVENTION

In view of the above, the present applicant has developed a detachable golf club carrier, such as a pull cart, that can be outfitted to existing golf carts using an easily retrofitted hitch. This invention is the subject matter of U.S. patent application Ser. No. 09/924,039, entitled MOTORIZED GOLF CART WITH DETACHABLE GOLF CLUB CARRIER filed Aug. 7, 2001, which is hereby incorporated by reference herein.

While it is advantageous to use detachable golf club carriers on retrofitted existing golf carts, an object of the present invention is to provide a motorized golf cart for attachable golf club carriers which require less space than retrofitted golf carts. An additional or alternate object of the present invention is to provide a protected area for attached golf club carriers. Yet another or alternate object of the present invention is to provide a hitch easily fixed to a frame of a motorized golf cart.

The present invention provides a motorized golf cart for movement over a ground surface, the golf cart having a motor, a vertical golf bag bay; a hitching device in the vertical golf bag bay and a wheeled golf club carrier selectively attachable to the hitching device.

'Vertical golf bag bay" as defined herein is a golf bag bay without a bottom, i.e. without a horizontal surface on which a golf bag bottom rests. Conventional golf carts now have a horizontal surface on which the bottom of the golf bag rests, and thus do not have vertical golf bag bays as defined herein. Vertical golf bag bays as defined herein thus may include, for example, an open rear end of the golf cart just behind the seats and also one with a U-shaped formed by two protective bumpers.

The wheeled golf club carrier preferably includes a hitching device removably connected to the first hitching device.

The wheeled golf club carrier thus can be easily attached and detached to the motorized golf cart, with the golf cart not requiring a traditional bag bay with a bottom on which a golf bag must rest. The golfer can hitch and unhitch the golf club carrier in the bottomless bag bay and wheel it, along with all the golfer's golf clubs, to a desired location on the course.

Preferably, two hitches are provided within the bag bay.

Also preferably, the bag bay has two protective extensions for aiding in protecting the clubs when attached with the carriers in the bag bay.

In a highly preferable embodiment, the wheels of the golf club carrier first are on the ground and then retracted from the ground surface as the second hitching device is connected to the first hitching device. With retraction, the golf clubs and the carrier thus are better protected on the cart as the cart moves, as ground disturbances are not transferred via the wheel of the golf club carrier as the golf cart is driven. Moreover, reverse motions of the cart will not cause the golf club carrier to jackknife or be damaged.

However, the wheel of the golf club carrier could remain on the ground in a less preferable embodiment. The golf club carrier then preferably includes at least one shock absorber.

The first hitching device may include a bar and the second hitching device a latch for latching onto the bar.

Preferably, the motorized golf cart preferably has two seats.

The golf club carrier preferably includes a golf club bag removable from the carrier body, although the bag may be integrated with the golf club carrier.

Preferably, the bag bay is at the rear of the golf cart.

The present invention also provides a golf cart comprising a frame, a motor supported in the frame, at least one seat supported in the frame, and two hitching devices connected to the frame, the hitching devices operative for attaching a detachable wheeled golf club carrier.

The hitching devices preferably are detachable from the golf cart, for example through screws, although they may be manufactured integrally with the frame.

Most preferably, the hitching device is located less than or equal to 0.25 meters from the ground when the golf cart is in operation, so a proper leverage with the golf club carrier can be achieved. The hitching device may include a second section located above the lowest point, i.e. a two hitch configuration. The second section may be located more than 0.25 meters from the ground.

The present invention also provides a method for manufacturing a motorized golf cart comprising the steps of attaching two golf club carrier hitches to a frame of the motorized golf cart.

Preferably, the two hitches are located within a vertical bag bay.

This provides an advantage over existing carts, where a flat surface must be provided to support a bottom of the golf bags. Shorter and more compact golf carts can be designed.

Hitching device as defined herein is any type of connecting device operable to prevent the golf club carrier from detaching from the motorized golf cart during normal operation on a golf course, and may include an existing part of conventional golf carts or golf club carriers. It also may include more than one part separated from another, e.g. the interconnection of the first and second hitching devices may occur at more than just a single point.

BRIEF DESCRIPTION OF THE DRAWINGS OF A PREFERRED EMBODIMENT

The present invention will be shown with reference to a preferred embodiment, in which:

FIG. 5 shows a side view of a golf club carrier attached in the vertical bag bay.

DETAILED DESCRIPTION OF THE PREFERRED EMBODIMENT

The present invention will be described with reference to a preferred embodiment in which the motorized golf cart has a vertical bag bay with two protective extensions.

Figure 1:
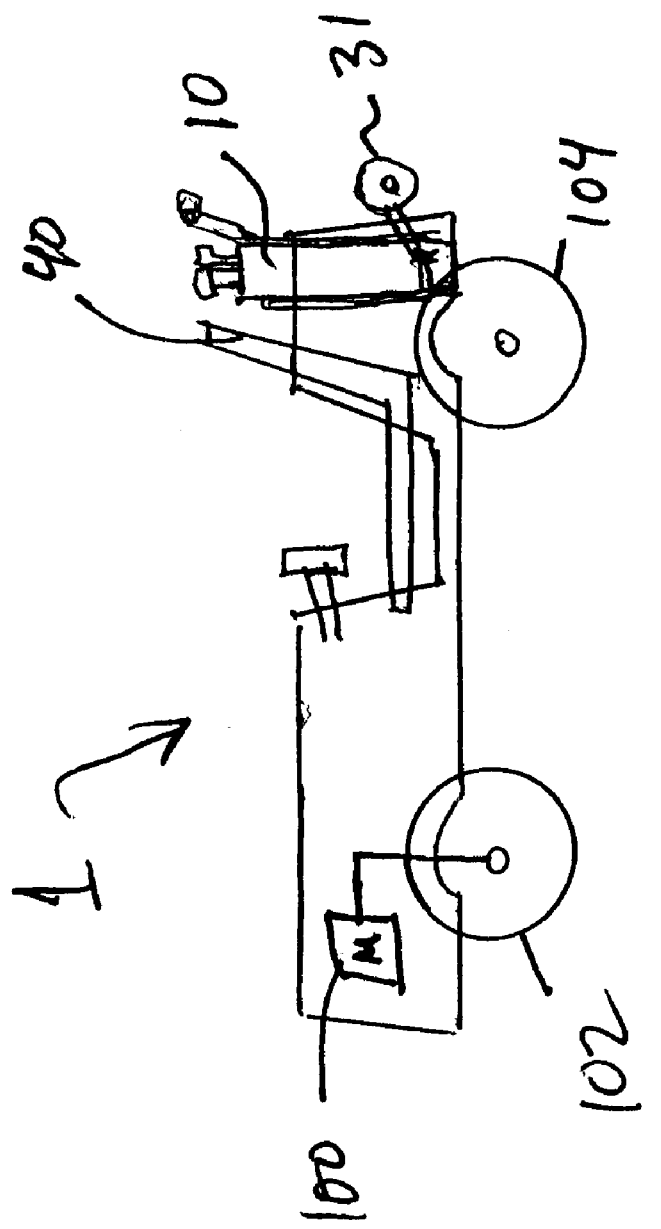
FIG. 1 shows a side view of the golf cart of the present invention with a detachable wheel golf club carrier attached in the vertical bag bay and its wheels retracted.

FIG. 1 shows, in schematic form, a motorized golf cart 1, i.e. a motorized golf car, having a motor 100 driving front wheels 102 or rear wheels 104 of the cart 1. The motor 100 may be any type of motor, for example electric or internal combustion driven. The cart 1 preferably is a two seat, four wheel vehicle, with seat 40.

A wheeled golf club carrier 10, for example a pull cart, having retractable wheels 31 is detachably connected to a mount in the bag bay.

Figure 2:
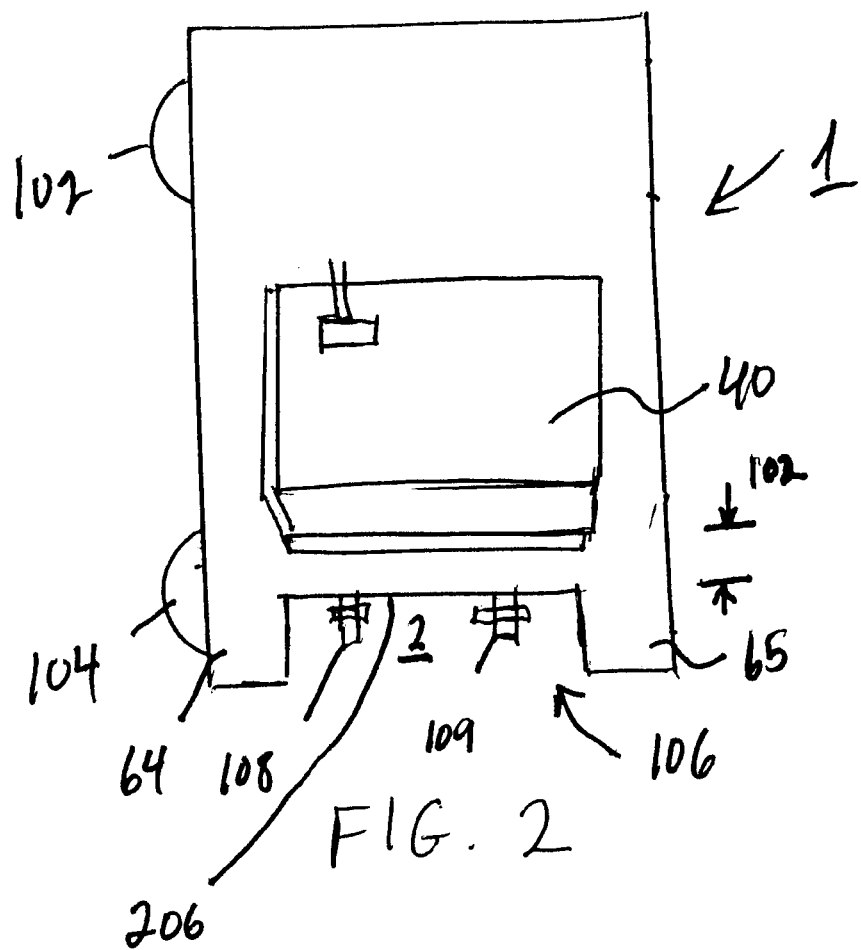
FIG. 2 shows a top view of the golf cart of the present invention.

FIG. 2 shows a top view of the motorized golf cart 1. Golf cart 1 has a vertical bag bay 106, which as can be seen, is open at the bottom to the ground 2 and thus is bottomless. Mounts 108 and 109 are located in the bag bay 106, and are connected to the frame of the golf cart 1.

Two protective extensions 64 and 65 may be provided at the sides of the bag bay 106 so that the bag bay is U-shaped. However, the bag bay may simply be the end of the golf cart, with no protective extensions.

Preferably, the distance 102 between a rearmost part of seat 40 and the forward edge 206 of bag bay is 0.25 meters or less. Edge 206 preferably is vertical. No room for a traditional bag bay thus is present, resulting in a more compact cart 1.

Figure 3:
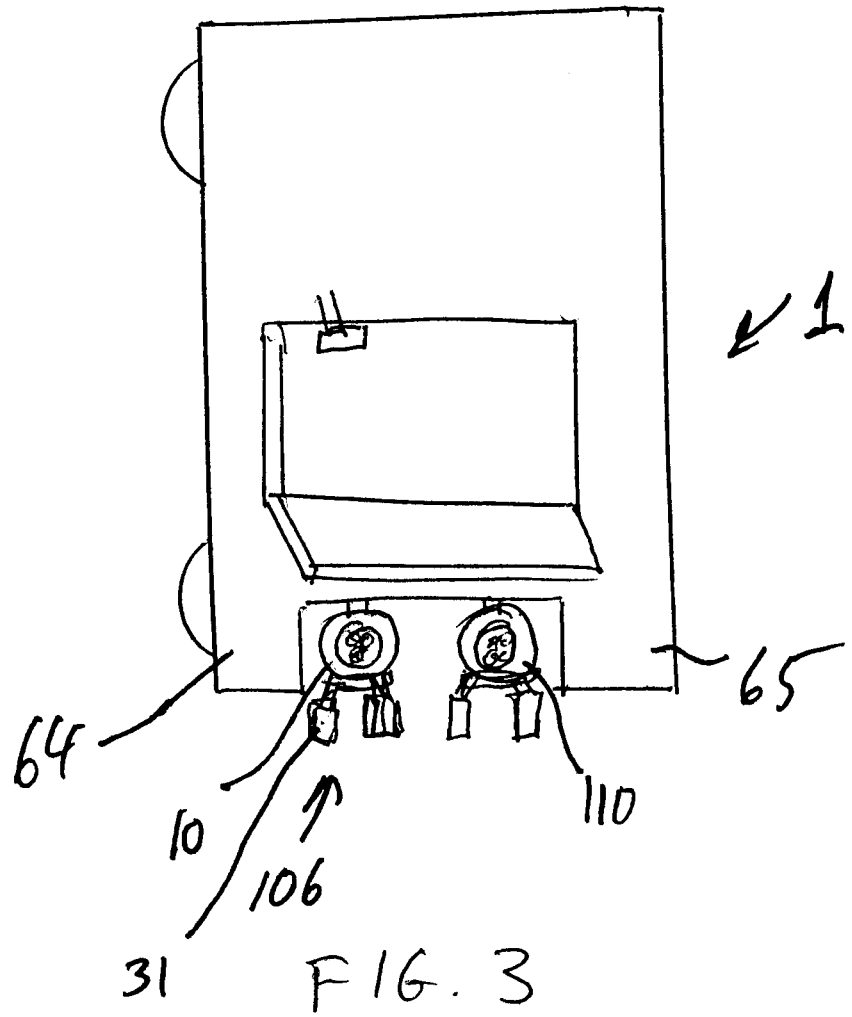
FIG. 3 shows a top view of the golf cart of the present invention with the two golf club carriers attached.

FIG. 3 shows the detachable golf club carriers 10, 110 located within the bag bay 106. While wheels 31 of the carriers may extend past the protective extensions 64, 65, the clubs themselves are protected.

Figure 4:
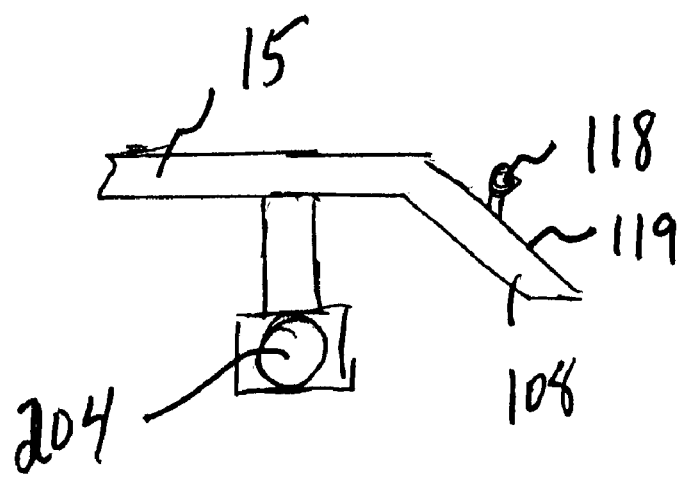
FIG. 4 shows a part of a frame of the golf cart of the present invention with an integral hitch.

FIG. 4 shows one embodiment of a mount bracket 108 for the golf club carriers 10, 110. A bar 118 is provided extending on a support above a sloped surface 119. The mount bracket 108 is integral with a frame 15 of the motor vehicle, on which an axle 204 for wheels 104 is also supported.

However, the mount brackets 108, 109 also may be detachable, attaching for example to screw holes in the frame that may also be used for a towing bar. The mount brackets 108, 109 may also attach to another part of the vehicle with sufficient strength to support the detachable golf club carriers.

The mount brackets 108, 109 preferably are located approximately 0.25 meters, or less, above the ground 2. This provides enough clearance for the mount brackets 108, 109, and yet provides for easy detachment and attachment of the carriers 10, 110 from cart 1.

FIG. 5 shows more details of a possible golf club carrier 10 for use with the golf cart 1 of the present invention. This golf club carrier 10 for example may be similar to that disclosed in U.S. patent application Ser. No. 09/924,039, entitled MOTORIZED GOLF CART WITH DETACHABLE GOLF CLUB CARRIER filed Aug. 7, 2001, which is hereby incorporated by reference herein. Wheels 31 are retracted. By pulling down handle 19, the wheels return to the ground 2 and the carrier can detach from mount 108 with its bar 118.

What is claimed is:

1. A motorized golf cart for movement over a ground surface comprising:

a motor, seating for at least two golfers;

a rear vertical golf bag bay, a first golf club carrier hitching device in the vertical golf bag bay;

a second golf club carrier hitching device in the vertical golf bag bay; and a wheeled golf club carrier selectively attachable to one of the first and second hitching devices.

2. The golf cart as recited in claim 1 wherein the wheeled golf club carrier includes a retractable wheel.

3. The golf cart as recited in claim 2 wherein the golf club carrier has a detachable golf bag.

4. The golf cart as recited in claim 1 wherein the bag bay has two protective extensions, so as to define a U-shape.

5. The golf cart as recited in claim 1 wherein one of the first hitching device, second hitching device and the golf club carrier has a horizontal mount tube.

6. The golf cart as recited in claim 5 wherein one of the first hitching device, second hitching device and golf club carrier includes at least one mount claw having an opening for attaching to the horizontal mount tube.

7. A motorized golf cart for movement over a ground surface comprising:

a motor, seating for at least two golfers;

a rear vertical golf bag bay, a first golf club carrier hitching device in the vertical golf bag bay;

a second golf club carrier hitching device in the vertical golf bag bay; and a wheeled golf club carrier selectively attachable to one of the first and second hitching devices while the wheeled golf club carrier is on the ground surface.

8. The golf cart as recited in claim 7 wherein the wheeled golf club carrier includes a retractable wheel.

9. The golf cart as recited in claim 7 wherein one of the first hitching device, second hitching device and the golf club carrier has a horizontal mount tube.

10. The golf cart as recited in claim 9 wherein one of the first hitching device, second hitching device and golf club carrier includes at least one mount claw having an opening for attaching to the horizontal mount tube.

11. The golf cart as recited in claim 7 wherein the bag bay has two protective extensions, so as to define a U-shape.

12. The golf cart as recited in claim 7 wherein the golf club carrier has a plurality of retractable wheels.

13. The golf cart as recited in claim 7 wherein the golf club carrier has a detachable golf bag.

\* \* \* \* \*